United States Patent
Chung et al.

(10) Patent No.: US 10,192,091 B2
(45) Date of Patent: Jan. 29, 2019

(54) FINGERPRINT SENSOR APPARATUS AND A METHOD FOR CONTROLLING THE FINGERPRINT SENSOR APPARATUS

(71) Applicant: Novatek Microelectronics Corp., Hsinchu (TW)

(72) Inventors: Hsing-Lung Chung, Miaoli County (TW); Tsung-Chan Lee, Hsinchu (TW); Hsin-Kuo Chen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 15/136,998

(22) Filed: Apr. 25, 2016

(65) Prior Publication Data

US 2017/0308729 A1 Oct. 26, 2017

(51) Int. Cl.
*G06K 9/00* (2006.01)
*G06F 3/041* (2006.01)

(52) U.S. Cl.
CPC ......... *G06K 9/0002* (2013.01); *G06F 3/0414* (2013.01); *G06K 9/00087* (2013.01); *G06K 9/00912* (2013.01)

(58) Field of Classification Search
CPC ............ G06K 9/0002; G06K 9/00087; G06K 9/00912; G06F 3/0414
See application file for complete search history.

(56) References Cited

U.S. PATENT DOCUMENTS

| 6,131,464 | A | 10/2000 | Pare, Jr. et al. | |
| 7,277,563 | B2 | 10/2007 | Chou | |
| 7,280,679 | B2* | 10/2007 | Russo | G06F 3/0414 340/5.53 |
| 7,460,109 | B2* | 12/2008 | Safai | G06F 3/03547 345/173 |
| 8,310,372 | B2 | 11/2012 | Kukula et al. | |
| 8,694,793 | B2* | 4/2014 | Evans | G06F 21/32 713/182 |
| 8,878,790 | B2* | 11/2014 | Abele | G06K 9/0002 257/254 |
| 9,672,408 | B2* | 6/2017 | Johansson | G06K 9/00087 |
| 2001/0027380 | A1 | 10/2001 | Hierold | |

(Continued)

FOREIGN PATENT DOCUMENTS

| CN | 1201261 | 5/2005 |
| CN | 202428735 | 9/2012 |

*Primary Examiner* — Mia M Thomas
(74) *Attorney, Agent, or Firm* — JCIPRNET

(57) ABSTRACT

A fingerprint sensor apparatus including a sampling unit, an image analysing unit and a processor is provided. The sampling unit senses a fingerprint image. The image analysing unit analyses an image parameter of the fingerprint image to obtain an image data, and compares the image data to a reference data to obtain a comparison result. The comparison result includes that the image data corresponds to one of a plurality of stages. The stages are determined based on the image parameter, and the different stages correspond to different pressure regions. The processor controls an electronic device to execute a predetermined operation according to the stage corresponding to the image data. In addition, a method for controlling the fingerprint sensor apparatus is also provided.

14 Claims, 6 Drawing Sheets

(56) References Cited

U.S. PATENT DOCUMENTS

| | | | |
|---|---|---|---|
| 2007/0076924 A1* | 4/2007 | Fujii | G06K 9/00013 382/124 |
| 2008/0091121 A1* | 4/2008 | Sun | A61B 5/0059 600/587 |
| 2008/0166028 A1* | 7/2008 | Turek | G06K 9/0002 382/124 |
| 2009/0219154 A1* | 9/2009 | Kukula | G06K 9/00006 340/540 |
| 2010/0066697 A1* | 3/2010 | Jacomet | G06F 3/0414 345/173 |
| 2011/0267445 A1* | 11/2011 | Oguchi | A61B 5/1172 348/77 |
| 2013/0234977 A1* | 9/2013 | Lin | G06F 3/044 345/174 |
| 2014/0003677 A1* | 1/2014 | Han | G06K 9/00006 382/124 |
| 2014/0354585 A1 | 12/2014 | Cok et al. | |
| 2015/0301684 A1* | 10/2015 | Shimamura | G06F 3/0414 345/174 |
| 2015/0324566 A1* | 11/2015 | Miura | G06K 9/0004 726/19 |
| 2015/0358317 A1* | 12/2015 | Deutschmann | H04L 63/0861 713/186 |
| 2015/0363585 A1* | 12/2015 | Gooding | G06F 21/32 726/19 |
| 2016/0026316 A1* | 1/2016 | Choi | G06F 1/3231 345/173 |
| 2016/0188947 A1* | 6/2016 | Bechtel | G06K 9/00013 382/124 |
| 2016/0224168 A1* | 8/2016 | Watanabe | G06F 3/0414 |
| 2016/0247013 A1* | 8/2016 | Johansson | G06F 17/30247 |
| 2016/0253041 A1* | 9/2016 | Park | G06F 3/0418 |
| 2016/0357298 A1* | 12/2016 | Kim | G06F 1/1626 |
| 2017/0052630 A1* | 2/2017 | Kim | H04L 67/42 |

* cited by examiner

FINGERPRINT SENSOR APPARATUS AND A METHOD FOR CONTROLLING THE FINGERPRINT SENSOR APPARATUS

BACKGROUND OF THE INVENTION

1. Field of the Invention

The invention generally relates to a sensor apparatus and a method for controlling the sensor apparatus, in particular, to a fingerprint sensor apparatus and a method for controlling the fingerprint sensor apparatus.

2. Description of Related Art

In current market, a touch fingerprint sensor apparatus senses a pressure value applied thereto in a manner of capacitive scheme or mechanical scheme. The touch fingerprint sensor apparatus determines a touch is valid while the pressure value applied to the touch fingerprint sensor apparatus is larger than a predetermined threshold, and an electronic device including the touch fingerprint sensor would execute a corresponding operation. The predetermined threshold is usually set to be constant. However, if the pressure value applied to the touch fingerprint sensor apparatus is not larger than the predetermined threshold, the electronic device would do nothing at all. The constant predetermined threshold would cause needless inconvenience to the user that touches the touch fingerprint sensor apparatus. For example, the electronic device can not execute a specific operation according to a pressure region, or the electronic device may do nothing at all due to a light touch.

Hence, how to provide a fingerprint sensor apparatus that has a good user experience and satisfactory sensing quality without causing needless inconvenience to the user is one of the most important topics in the pertinent field.

SUMMARY OF THE INVENTION

Accordingly, the invention is directed to a fingerprint sensor apparatus and a method for controlling the fingerprint sensor apparatus, capable of providing a good user experience.

An embodiment of the invention provides a fingerprint sensor apparatus including a sampling unit, an analysing unit and a processor unit. The sampling unit is configured to sense a fingerprint image. The analysing unit is coupled to the sampling unit. The analysing unit is configured to analyse an image parameter of the fingerprint image to obtain an image data, and compare the image data to a reference data to obtain a comparison result. The comparison result includes that the image data locates in which one of a plurality of stages. The processor unit is coupled to the analysing unit. The processor unit is configured to control an electronic device to execute a predetermined operation according to the stage that the image data locates.

In an embodiment of the invention, the plurality of stages are determined according to the image parameter, and the different stages correspond to different pressure regions.

In an embodiment of the invention, the image data includes a statistic information. The analysing unit compares the statistic information to an average, an extremum or a distribution of the reference data, and transmits the comparison result to the processor unit.

In an embodiment of the invention, the processor unit determines whether to activate the electronic device to execute the predetermined operation according to the stage that the image data locates via an application unit.

In an embodiment of the invention, the fingerprint sensor apparatus further includes the application unit. The application unit is controlled by the processor unit. The application unit is configured to control the electronic device to execute the predetermined operation.

In an embodiment of the invention, the processor unit outputs a signal representative of a pressure value of a fingerprint or the predetermined operation to be executed according to the stage that the image data locates.

In an embodiment of the invention, the processor unit includes a control circuit. The control circuit is configured to output the signal representative of the pressure value of the fingerprint or the predetermined operation to be executed.

In an embodiment of the invention, the representative signal is a screen notification, a sound notification or a vibrating alert.

In an embodiment of the invention, the fingerprint sensor apparatus further includes a storage unit. The storage unit is controlled by the processor unit. The storage unit is configured to store the reference data. The reference data includes an information of a fingerprint pre-stored in the fingerprint sensor apparatus.

An embodiment of the invention provides a method for controlling a fingerprint sensor apparatus. The method for controlling the fingerprint sensor apparatus includes: sensing a fingerprint image; analysing an image parameter of the image to obtain an image data, and comparing the image data to a reference data to obtain a comparison result; and controlling an electronic device to execute a predetermined operation according to a stage that the image data locates. The comparison result includes that the image data locates in which one of a plurality of stages.

In an embodiment of the invention, the plurality of stages are determined according to the image parameter, and the different stages correspond to different pressure regions.

In an embodiment of the invention, the image data includes a statistic information. The step of comparing the image data to the reference data to obtain the comparison result includes: comparing the statistic information to an average, an extremum or a distribution of the reference data.

In an embodiment of the invention, the step of controlling an electronic device to execute the predetermined operation according to the stage that the image data locates includes: determining whether to activate the electronic device to execute the predetermined operation according to the stage that the image data locates.

In an embodiment of the invention, the method for controlling the fingerprint sensor apparatus further includes: outputting a signal representative of a pressure value of a fingerprint or the predetermined operation to be executed according to the stage that the image data locates.

In an embodiment of the invention, the representative signal is a screen notification, a sound notification or a vibrating alert.

In an embodiment of the invention, the method for controlling the fingerprint sensor apparatus further includes: storing the reference data into a storage unit, wherein the reference data comprises a fingerprint information pre-stored in the fingerprint sensor apparatus.

Based on the above, in exemplary embodiments of the invention, the fingerprint sensor apparatus controls the electronic device to execute a predetermined operation according to the pressure values of the fingerprint, so as to provide a good user experience.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
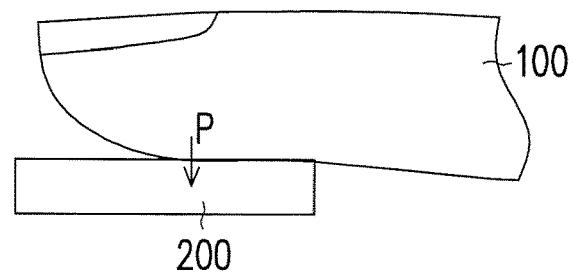
FIG. 1 illustrates a schematic diagram of a fingerprint sensor apparatus touched by a user according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The following will describe some embodiments as examples of the invention. However, it should be noted that the invention is not limited to the disclosed embodiments. Moreover, some embodiments may be combined where appropriate. The term "couple" used throughout this specification (including the claims) may refer to any direct or indirect connection means. For example, if it is described that the first device is coupled to the second device, it should be understood that the first device may be directly connected to the second device or indirectly connected to the second device through other devices or certain connection means. In addition, the term "signal" may stand for at least one current, voltage, electric charge, temperature, data, electromagnetic wave, or any other signal or signals.

Figure 2:
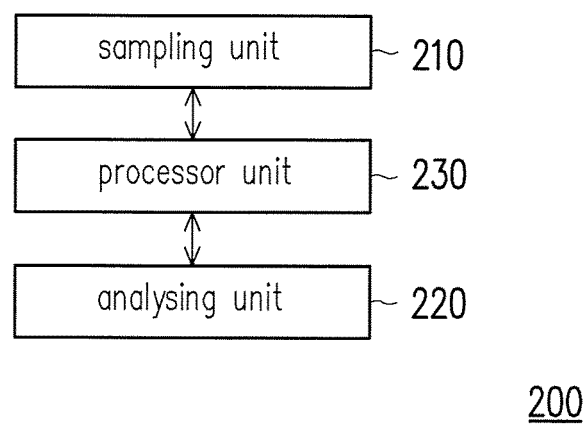
FIG. 2 illustrates a block diagram of the fingerprint sensor apparatus depicted in FIG. 1 according to an embodiment of the invention.
Figure 3:
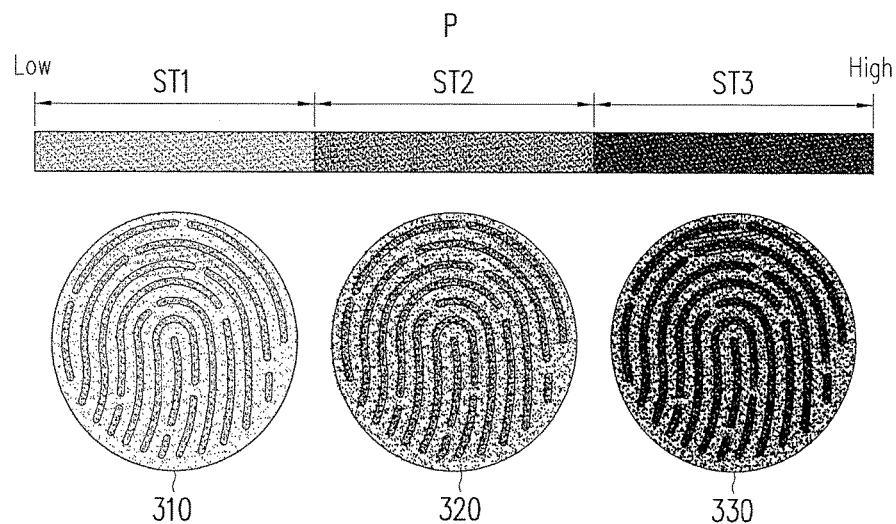
FIG. 3 illustrates a schematic diagram of a plurality of pressure stages according to an embodiment of the invention.

FIG. 1 illustrates a schematic diagram of a fingerprint sensor apparatus touched by a user according to an embodiment of the invention. FIG. 2 illustrates a block diagram of the fingerprint sensor apparatus depicted in FIG. 1 according to an embodiment of the invention. FIG. 3 illustrates a schematic diagram of a plurality of pressure stages according to an embodiment of the invention. Referring to FIG. 1 to FIG. 3, an electronic device of the present embodiment may include the fingerprint sensor apparatus 200 as illustrated in FIG. 2 for sensing a fingerprint of a user 100. The electronic device may be a smartphone, a phablet, a tablet, a smartwatch, or a smart band. Nevertheless, the invention is not intended to limit the type of the electronic device.

In the present embodiment, the fingerprint sensor apparatus 200 includes a sampling unit 210, an analysing unit 220, and a processor unit 230. The sampling unit 210 is configured to sense a fingerprint image, and may include an image sampling circuit and a sensor circuit. In the present exemplary embodiment, the sensor circuit includes, for example, a charge coupled device image sensor (CCD image sensor) or a complementary metal oxide semiconductor (CMOS) image sensor or the like, which are not particularly limited by the invention. In the present embodiment, the image sampling circuit may be implemented by using any image sampling circuit in the related art, which are not particularly limited by the invention. Therefore, enough teaching, suggestion, and implementation illustration for internal circuit structures and implementations of the image sampling circuit and the sensor circuit may be obtained with reference to common knowledge in the related art, which are not repeated hereinafter.

In the present embodiment, according to the pressure value P applied to the fingerprint sensor apparatus 200, the fingerprint image may have different grayscale values. For example, as illustrated in FIG. 3, the pressure values P are divided into a plurality of stages ST1 to ST3, and each of the stages ST1 to ST3 corresponds to a range of the pressure values P. In the present embodiment, from left to right, the pressure values P gradually increases, but the grayscale values gradually decreases. The fingerprint image 310 has a high grayscale value, and the fingerprint image 330 has a low grayscale value, but the invention is not limited thereto. In other words, the plurality of stages ST1 to ST3 are determined according the grayscale values of the fingerprint image, and the different stages correspond to different pressure regions.

It should be noted that the grayscale values are exemplarily disclosed in the present embodiment for description, and the invention is not limited thereto. In an embodiment, the plurality of stages ST1 to ST3 may be determined according other image parameters. The image parameters may include the image resolution, the image brightness, the image spectral distribution, the image discrepancy, the image relevancy, the image color depth, etc., and the invention is not limited thereto. In addition, the number of the stages divided in the pressure values P as described in this embodiment should not be construed as a limitation to the invention.

In the present embodiment, the analysing unit 220 is coupled to the sampling unit 210 via the processor unit 230. The analysing unit 220 analyses, for example, the grayscale value of the sampled fingerprint image to obtain an image data, and compares the image data to a reference data to obtain a comparison result. In the present embodiment, the comparison result includes that the image data locates in which one of the stages ST1 to ST3. The reference data may include an information of the fingerprint, e.g. an enrolled fingerprint, pre-stored in the fingerprint sensor apparatus 200.

In the present embodiment, the processor unit 230 is coupled to the sampling unit 210 and the analysing unit 220. The processor unit 230 is configured to control the electronic device to execute a predetermined operation according to the stage that the image data locates. For example, since different users may apply different pressure values to the fingerprint sensor apparatus 200, by distinguishing relative pressure values, e.g. light pressure or heavy pressure, the processor unit 230 may unlock the electronic device based on the stage that the image data locates to avoid erroneous operations.

In an embodiment, the processor unit 230 includes, for example, Central Processing Unit (CPU), Microprocessor, Digital Signal Processor (DSP), Programmable Controller, Programmable Logic Device (PLD), or other similar devices, a combination of the said devices, which are not particularly limited by the present disclosure. Further, in an embodiment, the analysing unit 220 in FIG. 2 may also be implemented as a plurality of program codes. These program codes will be stored in one memory, so that these program codes may be executed by the processor unit 230 later. Alternatively, in an embodiment, the analysing unit 220 in FIG. 2 may be implemented as one or more circuits. The invention is not intended to limit whether the analysing unit 220 in FIG. 2 is implemented by ways of software or hardware.

Figure 4:
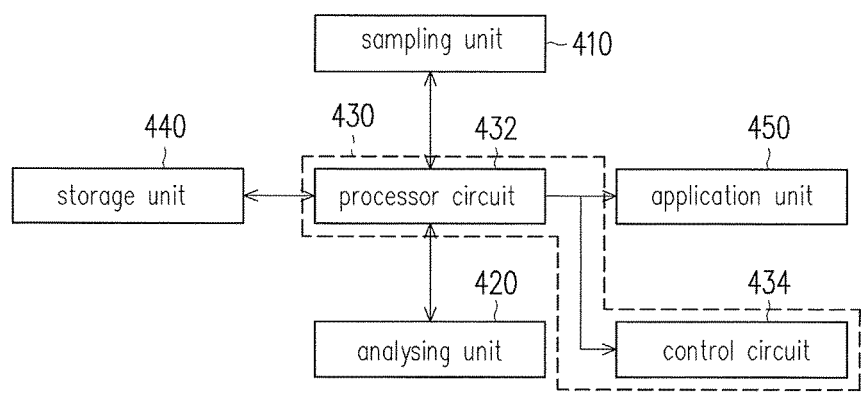
FIG. 4 illustrates a block diagram of a fingerprint sensor apparatus according to another embodiment of the invention.

FIG. 4 illustrates a block diagram of a fingerprint sensor apparatus according to another embodiment of the invention. Referring to FIG. 2 and FIG. 4, the fingerprint sensor apparatus 400 of the present embodiment is similar to the fingerprint sensor apparatus 200 depicted in FIG. 2, and the main difference, for example, lies in that the fingerprint sensor apparatus 400 further includes a storage unit 440 and an application unit 450, and a processor unit 430 includes a processor circuit 432 and a control circuit 434.

To be specific, the sampling unit 410 is configured to sample a fingerprint image by the sensor circuit thereof when the user presses the fingerprint sensor apparatus 400, and then provide the sampled information to the processor circuit 432. The sampling unit 410 may sample the fingerprint image when the fingerprint is enrolled, when the fingerprint is authenticated, or when other fingerprint application operations are executed. The timing for sensing the fingerprint image may be set by the processor unit 430.

In the present embodiment, the processor unit 430 includes the processor circuit 432 and the control circuit 434. The processor circuit 432 is configured to process information from each unit, and control each of the units. For example, the processor circuit 432 transmits instructions to the sampling unit 410, and thereby controls the sampling unit 410 to sample the fingerprint image. In the present embodiment, the processor circuit 432 receives information analysed by the analysing unit 420. The processor circuit 432 determines whether to activate specific applications according to the analysed information. The processor circuit 432 informs the user 100 of relative pressure values according to a comparison of the analysed information and the data previously obtained from the user 100. The processor circuit 432 also transmits instructions to the analysing unit 420, and thereby controls the analysing unit 420 to store the pressure information to the storage unit 440 when the user 100 presses the fingerprint sensor apparatus 400.

In the present embodiment, the processor circuit 432 also transmits instructions to the storage unit 440, and accordingly controls the storage unit 440 to store the pressure information when the user 100 presses the fingerprint sensor apparatus 400 or the fingerprint information previously obtained from the user 100. The storage unit 440 determines whether to store the pressure information or the fingerprint information according to the instructions from the processor circuit 432. In other words, the storage unit 440 is controlled by the processor circuit 432, and configured to store the reference data. The reference data includes the information of the fingerprint pre-stored in the fingerprint sensor apparatus 400. In the present embodiment, the storage unit 440 may include a SRAM (static random access memory), a DRAM (dynamic random access memory), or a ROM (read-only memory). Nevertheless, the invention is not intended to limit the type of the storage unit 440.

In the present embodiment, the processor circuit 432 also transmits instructions to the control circuit 434, and thus controls the control circuit 434 to output corresponding control signals and inform the user 100 of current relative pressure values or application programs that can be activated. For example, according to the stage that the image data locates, the control circuit 434 outputs a signal representative of a pressure value of a fingerprint or the predetermined operation to be executed. In the present embodiment, the representative signal may be a screen notification, a sound notification or a vibrating alert, but the invention is not limited thereto.

In the present embodiment, the analysing unit 420 analyses an image parameter, e.g. grayscale values, of the fingerprint image to obtain an image data. The image data includes statistic information. The analysing unit 420 further compares the image data to the reference data to obtain a comparison result. The comparison result includes that the image data locates in which one of the stages ST1 to ST3. For example, the analysing unit 420 may analyse relative pressure values of the current fingerprint image. In the analysis procedure, the analysing unit 420 obtains the statistic information of the fingerprint image, and compares the statistic information to the reference data pre-stored in the storage unit 440. In the present embodiment, the analysing unit 420 estimates the relative pressure values of the current fingerprint image by comparing the statistic information to an average, an extremum or a distribution of the reference data, and transmits the comparison result to the processor circuit 432. Accordingly, the processor circuit 432 may obtain the information that the pressure values of the current fingerprint image are relatively high or low.

In addition, the method for obtaining the statistic information of the fingerprint image may be implemented by using any statistical method in the related art, which are not particularly limited by the invention. Therefore, enough teaching, suggestion, and implementation illustration for internal structures and implementations of the analysing unit 420 may be obtained with reference to common knowledge in the related art, which are not repeated hereinafter.

In the present embodiment, the control circuit 434 outputs corresponding control signals according to the instructions of the processor circuit 432, and displays notification information. For example, the control circuit 434 may output a screen notification to inform the user 100 of the relative pressure values of the current fingerprint image by displaying a pressure table on a display apparatus, and inform the user 100 that which application may be activated by the relative pressure values of the current fingerprint image. The control circuit 434 may also output a sound notification or a vibrating alert to inform the user 100 of the information about the relative pressure values of the current fingerprint image, so as to ask the user to increase or decrease the applied pressure. The information may include the current pressure value is over high or over low. In the present embodiment, the control circuit 434 may output at least one of the screen notification, the sound notification and the vibrating alert to inform the user 100.

In the present embodiment, the application unit 450 includes a plurality of application programs. Each of the application programs corresponds to a predetermined operation. The processor circuit 432 determines whether to activate the electronic device to execute a predetermined operation according to the stage ST1 to ST3 that the image data locates via the application unit 450. The application unit 450 is controlled by the processor circuit 432, and configured to control the electronic device to execute a predetermined operation. In the present embodiment, by adopting a manner of relative pressure with the notification scheme, the user 100 may execute a desired operation to avoid erroneous operations. In the present embodiment, the application unit 450 may be implemented by using any application program in the related art, which are not particularly limited by the invention. Therefore, enough teaching, suggestion, and implementation illustration for internal structures and implementations of the application unit may be obtained with reference to common knowledge in the related art, which are not repeated hereinafter.

Figure 5:
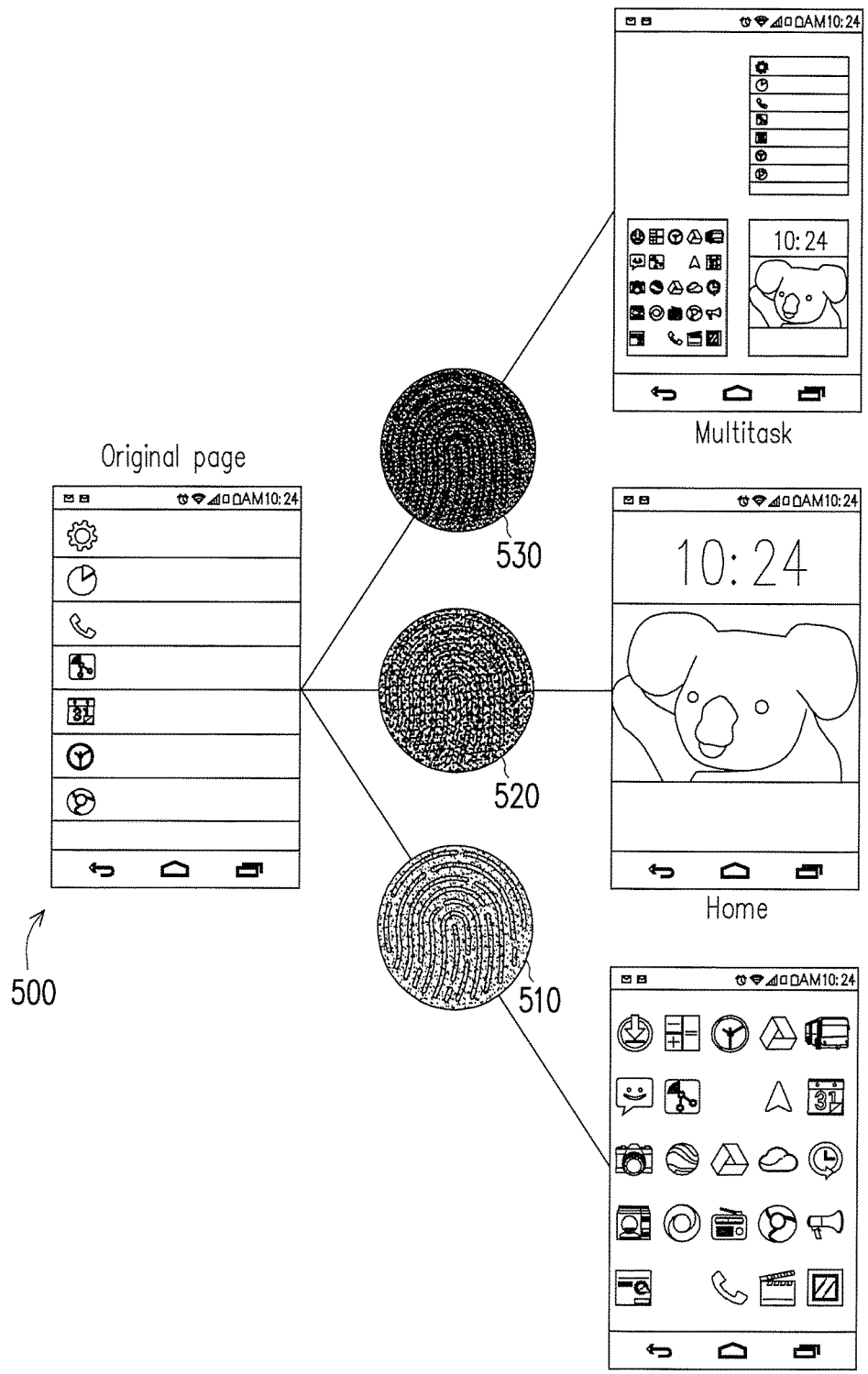
FIG. 5 illustrates a schematic diagram of an electrical device executing different operations according to an embodiment of the invention.

FIG. 5 illustrates a schematic diagram of an electronic device executing different operations according to an embodiment of the invention. Referring to FIG. 3 to FIG. 5, taking a smartphone as an example, the electronic device 500 may include the fingerprint sensor apparatus 400. The electronic device 500 displays an original page in the present embodiment. As the user 100 presses the fingerprint sensor apparatus 400, the fingerprint sensor apparatus 400 may sense a fingerprint image like a fingerprint image 510, 520 or 530. The grayscale values of the fingerprint image 510 locates in the stage ST1, and indicates a light pressure. The grayscale values of the fingerprint image 520 locates in the stage ST2, and indicates a normal pressure. The grayscale values of the fingerprint image 530 locates in the stage ST3, and indicates a heavy pressure. If the fingerprint sensor apparatus 400 senses the fingerprint image 510, the processor unit 430 controls the electronic device 500 to execute a "Back" operation, and the electronic device 500 displays a previous page. If the fingerprint sensor apparatus 400 senses the fingerprint image 520, the processor unit 430 controls the electronic device 500 to execute a "Home" operation, and the electronic device 500 displays a home page. If the fingerprint sensor apparatus 400 senses the fingerprint image 530, the processor unit 430 controls the electronic device 500 to execute a "Multitask" operation, and the electronic device 500 displays amultitask page. Nevertheless, the invention is not intended to limit the type of the electronic device and the type of the operation.

Figure 6:
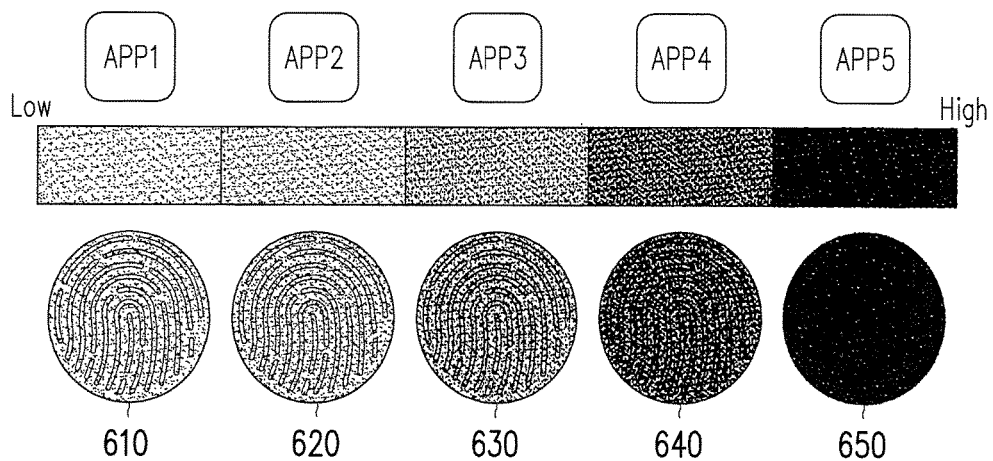
FIG. 6 illustrates a schematic diagram of different pressure stages corresponding to different application programs according to an embodiment of the invention.

FIG. 6 illustrates a schematic diagram of different pressure stages corresponding to different application programs according to an embodiment of the invention. Referring to FIG. 4 to FIG. 6, taking a smartphone as an example, in the present embodiment, the application unit 450 includes a plurality of application programs APP1 to APP5. The pressure values are divided into a plurality of stages, e.g. five stages, and each of the stages corresponds to a range of the pressure values and an application program. If the fingerprint sensor apparatus 400 senses the fingerprint image 610, which is a lightest pressure, the processor unit 430 controls the electronic device 500 to execute the application program APP1. If the fingerprint sensor apparatus 400 senses the fingerprint image 650, which is a heaviest pressure, the processor unit 430 controls the electronic device 500 to execute the application program APP2. The operations of other application programs executed by the electronic device 500 according to other fingerprint images can be deduced by analogy, and it is not repeated again herein.

Besides, the operations of the fingerprint sensor apparatuses described in exemplary embodiments of FIG. 5 and FIG. 6 are sufficiently taught, suggested, and embodied in the embodiments illustrated in FIG. 1 to FIG. 4, and therefore no further description is provided herein.

Figure 7:
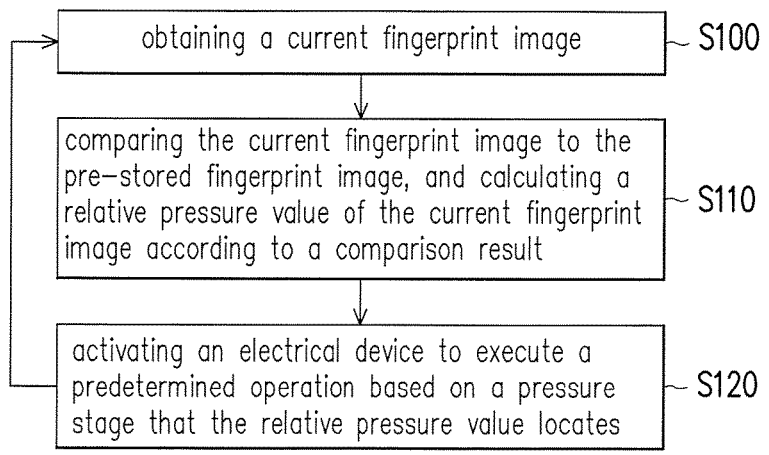
FIG. 7 is a flowchart illustrating steps in a method for controlling a fingerprint sensor apparatus according to an embodiment of the invention.

FIG. 7 is a flowchart illustrating steps in a method for controlling a fingerprint sensor apparatus according to an embodiment of the invention. Referring to FIG. 4 and FIG. 7, the method for controlling the fingerprint sensor apparatus of the presentembodiment is at least adapted to the fingerprint sensor apparatus 400 of FIG. 4, but the invention is not limited thereto. Taking the fingerprint sensor apparatus 400 of FIG. 4 for example, in step S100, the processor unit 430 obtains a current fingerprint image. In step S110, the processor unit 430 compares the current fingerprint image to the pre-stored fingerprint image of the storage unit 440, and calculates a relative pressure value of the current fingerprint image according to a comparison result. The comparison result may include information of grayscale difference therebetween and a pressure stage that the relative pressure value locates. In step S120, the processor unit 430 activates an electronic device to execute a predetermined operation based on the pressure stage that the relative pressure value locates. In the present embodiment, after step S120 is completed, the method may return to step S100, but the invention is not limited thereto. In an embodiment, the method may be finished in step S120. The method for controlling the fingerprint sensor apparatus described in the present embodiment is sufficiently taught, suggested, and embodied in the embodiments illustrated in FIG. 1 to FIG. 6, and therefore no further description is provided herein.

Figure 8:
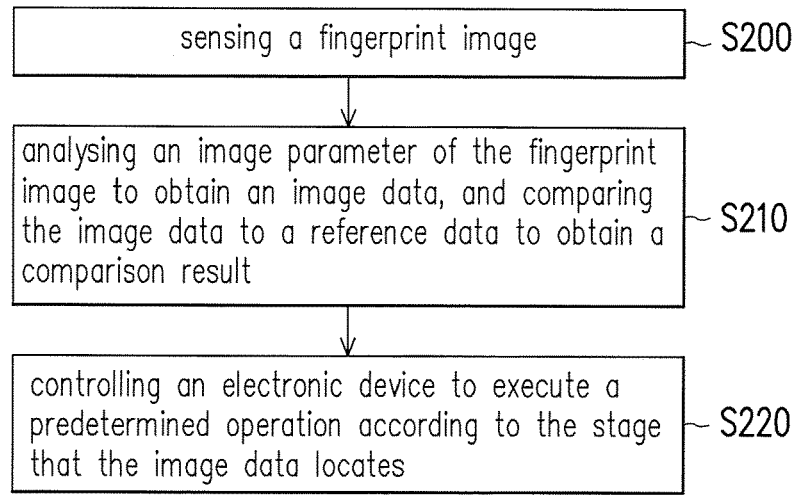
FIG. 8 is a flowchart illustrating steps in a method for controlling a fingerprint sensor apparatus according to another embodiment of the invention.

FIG. 8 is a flowchart illustrating steps in a method for controlling a fingerprint sensor apparatus according to another embodiment of the invention. Referring to FIG. 4 and FIG. 8, the method for controlling the fingerprint sensor apparatus of the present embodiment is at least adapted to the fingerprint sensor apparatus 400 of FIG. 4, but the invention is not limited thereto. Taking the fingerprint sensor apparatus 400 of FIG. 4 for example, in step S200, the sampling unit 410 senses a fingerprint image. In step S210, the analysing unit 420 analyses an image parameter of the fingerprint image to obtain an image data, and compares the image data to a reference data to obtain a comparison result. In the present embodiment, the comparison result includes that the image data locates in which one of a plurality of stages. In step S220, the processor unit 430 control an electronic device to execute a predetermined operation according to the stage that the image data locates. The method for controlling the fingerprint sensor apparatus described in the present embodiment is sufficiently taught, suggested, and embodied in the embodiments illustrated in FIG. 1 to FIG. 6, and therefore no further description is provided herein.

Figure 9:
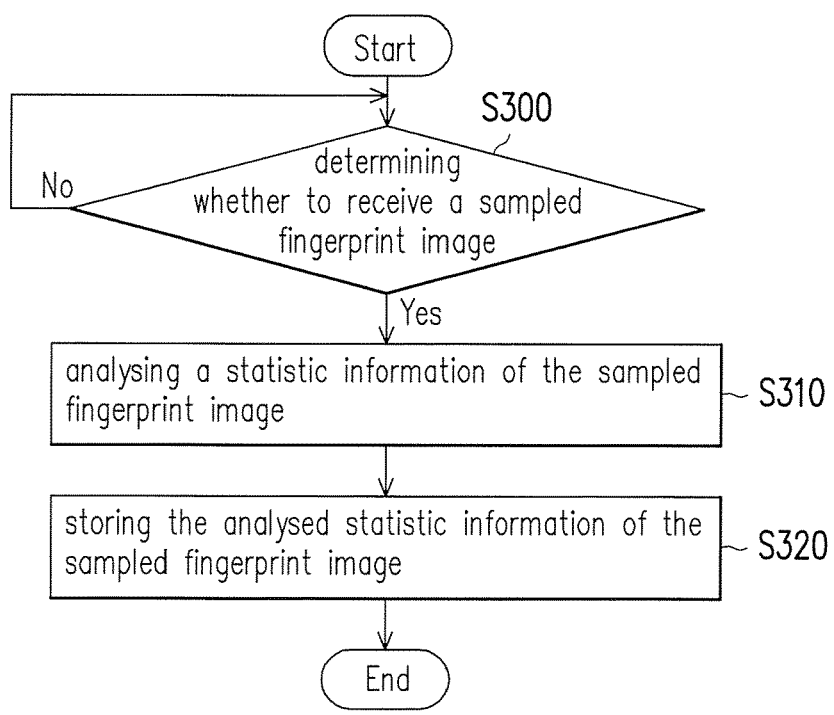
FIG. 9 is a flowchart illustrating steps in a method for collecting a fingerprint data according to an embodiment of the invention.

FIG. 9 is a flowchart illustrating steps in a method for collecting a fingerprint data according to an embodiment of the invention. Referring to FIG. 4 and FIG. 9, the method for collecting the fingerprint data of the present embodiment is at least adapted to the fingerprint sensor apparatus 400 of FIG. 4, but the invention is not limited thereto. Taking the fingerprint sensor apparatus 400 of FIG. 4 for example, in step S300, the processor unit 430 determines whether to receive a sampled fingerprint image. If the processor unit 430 receives the sampled fingerprint image, the analysing unit analyses a statistic information of the sampled fingerprint image in step S310. If the processor unit 430 does not receive the sampled fingerprint image, the method executes step S300 again. In step S320, the storage unit 440 stores the analysed statistic information of the sampled fingerprint image.

Figure 10:
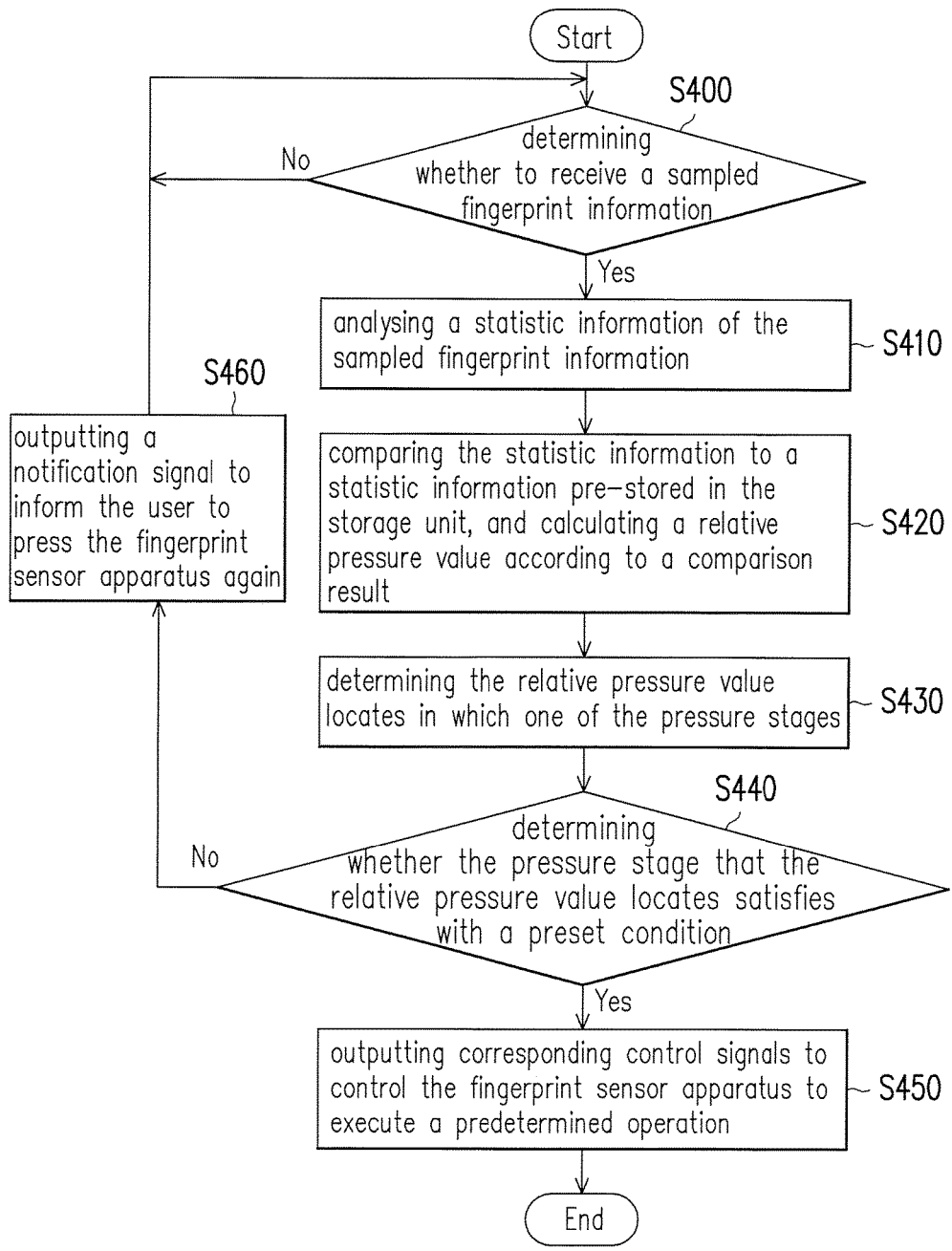
FIG. 10 is a flowchart illustrating steps in a method for controlling a fingerprint sensor apparatus according to another embodiment of the invention.

FIG. 10 is a flowchart illustrating steps in a method for controlling a fingerprint sensor apparatus according to another embodiment of the invention. Referring to FIG. 4 and FIG. 10, the method for controlling the fingerprint sensor apparatus of the present embodiment is at least adapted to the fingerprint sensor apparatus 400 of FIG. 4, but the invention is not limited thereto. Taking the fingerprint sensor apparatus 400 of FIG. 4 for example, in step S400, the processor unit 430 determines whether to receive a sampled fingerprint information. If the processor unit 430 receives the sampled fingerprint information, the analysing unit analyses a statistic information thereof in step S410. If the processor unit 430 does not receive the sampled fingerprint information, the method executes step S400 again.

In step S420, the analysing unit 420 compares the statistic information to a statistic information pre-stored in the storage unit 440, and calculates a relative pressure value according to a comparison result. In step S430, the processor unit 430 determines the relative pressure value locates in which one of the pressure stages. In S440, the processor unit 430 determines whether the pressure stage that the relative pressure value locates satisfies with a preset condition. The preset condition may include the grayscale value of the fingerprint image corresponding to the pressure stage is clear enough to be distinguished by the processor unit 430. If the pressure stage that the relative pressure value locates satisfies with the preset condition, the processor unit 430 outputs corresponding control signals to control the fingerprint sensor apparatus 400 to execute a predetermined operation in step S450. If the pressure stage that the relative pressure value locates does not satisfy with the preset condition, the processor unit 430 outputs a notification signal to inform the user 100 to press the fingerprint sensor apparatus 400 again in step S460. The method for controlling the fingerprint sensor apparatus described in the present embodiment is sufficiently taught, suggested, and embodied in the embodiments illustrated in FIG. 1 to FIG. 6, and therefore no further description is provided herein.

In summary, in exemplary embodiments of the invention, since different usersmay apply different pressure values to the fingerprint sensor apparatus, by distinguishing relative pressure values of the fingerprint, the processor unit unlocks the electronic device based on the stage that the image data locates to avoid erroneous operations. In exemplary embodiments of the invention, the fingerprint sensor apparatus adopts a manner of relative pressure with the notification scheme, the electronic device executes a predetermined operation for the user to avoid erroneous operations. In addition, when the user enrolls the fingerprint, pressure values are also recorded. The pressure values are divided into a plurality of stages, and each of the stages corresponds to a range of the pressure values and an application program. The application program is executed according to the stage that the pressure value of the fingerprint locates.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fingerprint sensor apparatus, comprising:
   a processor;
   a sampling unit comprising an image sampling circuit and a sensor circuit, coupled to the processor, and configured to sense a fingerprint image;
   an image analysing unit, coupled to the sampling unit and the processor, and the processor is configured to execute the image analysing unit to analyse an image parameter of the fingerprint image to obtain an image data, and compare the image data to a reference data to obtain a comparison result, wherein the comparison result comprises that the image data correspond to one of a plurality of stages,
   wherein the image parameter is one of a grayscale value, an image resolution, an image brightness, an image spectral distribution, an image discrepancy, an image relevancy and an image color depth of the fingerprint image, wherein the plurality of stages are determined according to the image parameter, and the plurality of different stages correspond to different pressure regions,
   wherein the processor is further configured to control an electronic device to execute a predetermined operation according to the stage corresponding to the image data, wherein the processor outputs a signal representative of a pressure value of a fingerprint according to the stage corresponding to the image data.

2. The fingerprint sensor apparatus according to claim 1, wherein the image data comprises a statistic information, and the image analysing unit compares the statistic information to an average, an extremum or a distribution of the reference data, and transmits the comparison result to the processor.

3. The fingerprint sensor apparatus according to claim 1, wherein the processor determines whether to activate the electronic device to execute the predetermined operation according to the stage corresponding to the image data via an application unit.

4. The fingerprint sensor apparatus according to claim 3, further comprising the application unit, controlled by the processor, and configured to control the electronic device to execute the predetermined operation.

5. The fingerprint sensor apparatus according to claim 1, wherein the processor further outputs a signal representative of the predetermined operation to be executed according to the stage corresponding to the image data.

6. The fingerprint sensor apparatus according to claim 5, wherein the processor comprises a control circuit, configured to output the signal representative of the pressure value of the fingerprint or the predetermined operation to be executed.

7. The fingerprint sensor apparatus according to claim 5, wherein the representative signal is a screen notification, a sound notification or a vibrating alert.

8. The fingerprint sensor apparatus according to claim 1, further comprising a storage unit, controlled by the processor, and configured to store the reference data, wherein the reference data comprises an information of a fingerprint pre-stored in the fingerprint sensor apparatus.

9. A method for controlling a fingerprint sensor apparatus, comprising:
   sensing a fingerprint image by a sampling unit comprising an image sampling circuit and a sensor circuit;
   executing the image analysing unit by a processor to analyse an image parameter of the fingerprint image to obtain an image data, and compare the image data to a reference data to obtain a comparison result, wherein the comparison result comprises that the image data correspond to one of a plurality of stages, wherein the image parameter is one of a grayscale value, an image resolution, an image brightness, an image spectral distribution, an image discrepancy, an image relevancy and an image color depth of the fingerprint image, wherein the plurality of stages are determined according to the image parameter, and the plurality of different stages correspond to different pressure regions; and outputting a signal representative of a pressure value of a fingerprint according to the stage corresponding to the image data and controlling an electronic device by the processor to execute a predetermined operation according to the stage corresponding to the image data.

10. The method for controlling the fingerprint sensor apparatus according to claim 9, wherein the image data comprises a statistic information, and the step of executing the image analysing unit by the processor to analyse an image parameter of the fingerprint image to obtain an image data, and compare the image data to the reference data to obtain the comparison result comprises:

executing the image analysing unit by the processor to compare the statistic information to an average, an extremum or a distribution of the reference data.

11. The method for controlling the fingerprint sensor apparatus according to claim 9, wherein the step of controlling an electronic device by the processor to execute the predetermined operation according to the stage corresponding to the image data comprises:

determining whether to activate the electronic device to execute the predetermined operation according to the stage corresponding to the image data.

12. The method for controlling the fingerprint sensor apparatus according to claim 9, further comprising:

outputting a signal representative of the predetermined operation to be executed according to the stage corresponding to the image data.

13. The method for controlling the fingerprint sensor apparatus according to claim 12, wherein the representative signal is a screen notification, a sound notification or a vibrating alert.

14. The method for controlling the fingerprint sensor apparatus according to claim 9, further comprising:

storing the reference data into a storage unit, wherein the reference data comprises a fingerprint information pre-stored in the fingerprint sensor apparatus.

\* \* \* \* \*